US006915711B1

(12) United States Patent
Backlund et al.

(10) Patent No.: US 6,915,711 B1
(45) Date of Patent: Jul. 12, 2005

(54) METHOD AND MEANS FOR MEASURING STRESS FORCES IN REFINERS

(75) Inventors: Hans-Olof Backlund, Sundsvall (SE); Esko Härkönen, Kajaani (FI)

(73) Assignee: Valmet Fibertech AB (SE)

( * ) Notice: Subject to any disclaimer, the term of this patent is extended or adjusted under 35 U.S.C. 154(b) by 70 days.

(21) Appl. No.: 10/018,126

(22) PCT Filed: Jun. 15, 2000

(86) PCT No.: PCT/SE00/01257

§ 371 (c)(1),
(2), (4) Date: Dec. 12, 2001

(87) PCT Pub. No.: WO00/78458

PCT Pub. Date: Dec. 28, 2000

(30) Foreign Application Priority Data

Jun. 17, 1999 (SE) ............................................. 9902306

(51) Int. Cl.$^{7}$ .......................... G01L 12/26; B02C 13/20
(52) U.S. Cl. ................................ 73/862.391; 241/261.3
(58) Field of Search ..................... 73/862.391, 862.323; 241/261.3, 30

(56) References Cited

U.S. PATENT DOCUMENTS

| | | | | |
|---|---|---|---|---|
| 5,747,707 A | * | 5/1998 | Johansson et al. | 73/862.623 |
| 5,827,112 A | * | 10/1998 | Ball | 451/21 |
| 6,314,381 B1 | * | 11/2001 | Johansson | 702/104 |
| 6,502,774 B1 | * | 1/2003 | Johansson et al. | 241/37 |
| 6,602,109 B1 | * | 8/2003 | Malkin et al. | 451/8 |

FOREIGN PATENT DOCUMENTS

| | | |
|---|---|---|
| SE | 407952 B | 4/1979 |
| SE | 504801-V2 | 4/1997 |

* cited by examiner

*Primary Examiner*—Max Noori
*Assistant Examiner*—Lilybett Martir
(74) *Attorney, Agent, or Firm*—Lerner, David, Littenberg, Krumholz & Mentlik, LLP

(57) ABSTRACT

Methods and apparatus for measuring the stress forces in refining disks are disclosed. The method includes providing a measuring surface comprising at least a portion of a plurality of refiner bars on the refining surface of a refining disk, resiliently mounting the measuring surface in the refiner surface, and measuring the stress forces across the measuring surface.

23 Claims, 2 Drawing Sheets

METHOD AND MEANS FOR MEASURING STRESS FORCES IN REFINERS

FIELD OF THE INVENTION

The present invention relates to a method and a measuring device for measuring stress forces in refiners having refining discs that between them define a refining gap for refining material.

BACKGROUND OF THE INVENTION

Refiners such as those noted above are used for refining material containing fiber. The refiner generally comprises refining members in the form of disks which rotate in relation to each other and between which the material for refining passes from the inner periphery of the refining members, where the material is supplied, to the outer periphery of the refining members, through a refining gap formed between the refining members. Often one of the refining disks is fixed whereas the other rotates. The refining disks are generally constructed from segments provided with bars on their surface. The inner segments can then have a coarser pattern and the outer segments a finer pattern in order to produce fine refining of the material.

To ensure high quality when refining material containing fiber, the disturbances in operating conditions that continually occur for various reasons must be corrected by constant control of the various refining parameters to optimum values. This can be achieved by altering the supply of water, for instance, so that a larger or smaller cooling effect is obtained, by changing the flow of material for refining, by adjusting the distance between the refining members, or by a combination of these measures. Accurate determination of the energy transferred to the material for refining, and also of the distribution of the energy over the surface of the refining members, are necessary to enable the necessary adjustments and corrections to be performed.

To determine the energy/output transferred to the material for refining, it is known to try to measure the shear forces appearing in the refining zone. What is known as a shear force occurs when two surfaces move in relation to each other with a viscous liquid between the surfaces. Such a shear force is also created in a refiner used for refining wood chips mixed with water. It may be imagined that the chips of wood are both sheared and rolled between the refining discs, as well as colliding with each other and with the bars. The shear force is caused, inter alia, by the combined force of the discs and by the coefficient of friction. The normal force exerted on the surface also varies with the radius.

As shown in Swedish Patent Application No. 504,801, a measuring device is known comprising a special sensor bar, i.e. a bar provided with sensors which sense the load exerted on the sensor bar during refining, at a number of measuring points along the bar. However, the drawback of this arrangement is that measuring is only performed on occasional bars, and the result is therefore unreliable. Furthermore, the type of transducer, or strain gauge, used in bar experiments have a short service life since the transducers are located close to the refining surface and the material used to screen the transducers from steam and pulp is subjected to an extremely demanding environment. However, despite these drawbacks, strain gauges must be used because of the design of this measuring device.

One object of the present invention is to solve the problems mentioned above and, first of all, to provide a method and a measuring device that produces a more reliable result than previously known devices, and also to provide a device with potential for a longer service life than previously known devices, thus making it more economical.

SUMMARY OF THE INVENTION

In accordance with the present invention, these and other objects have now been realized by the invention of a method of measuring the stress forces in a refining disk having a refining surface including a plurality of refiner bars and employed in a refiner including a pair of refiner disks defining a refining gap therebetween, the method comprising providing a measuring surface comprising at least a portion of a plurality of the refiner bars, resiliently mounting the measuring surface in the refiner surface, and measuring the stress forces across the measuring surface. Preferably, the resilient mounting of the measuring surface comprises resiliently journaling the measuring surface in a direction substantially parallel to the refining surface whereby the measuring surface is movable in the direction in response to a stress force with respect to a permanent force sensor connected to the measuring surface.

In accordance with one embodiment of the method of the present invention, the method includes calculating the size and distribution of the output transferred to material passing through the refining gap based on the stress force measured by the measuring surface, and employing the calculation to control the refining process.

In accordance with the present invention, apparatus has also been discovered for measuring stress forces in a refining disk having a refining surface including a plurality of refiner bars utilized in connection with a pair of refining disks defining a refining gap therebetween, comprising at least one measuring member disposed on the refiner surface and including a measuring surface including at least a portion of a plurality of the refiner bars, and resilient mounting means for resiliently mounting the at least one measuring member on the refiner surface. Preferably, the at least one measuring member comprises a plurality of measuring members.

In accordance with one embodiment of the apparatus of the present invention, the at least one measuring member comprises a force sensor and a measuring body connecting the force sensor to the measuring surface. Preferably, the force sensor is in abutment with the measuring body, and the apparatus includes attachment means for fixing the force sensor with respect to the measuring body. Preferably, the resilient mounting means comprises mounting means for resiliently journaling the measuring surface in a direction substantially parallel to the refiner surface.

In accordance with another embodiment of the apparatus of the present invention, the measuring surface is connected to the measuring body, and the measuring body extends from the measuring surface on the side of the force sensor so as to provide a measuring body extension, the measuring body extension including a joint portion where the measuring body is movable in a direction substantially parallel to the refiner surface. Preferably, the measuring body has a substantially circular cross-section, and the joint portion comprises a flattened portion of the measuring body disposed below the force sensor.

In accordance with one embodiment of the apparatus of the present invention, the force sensor comprises a piezoelectric sensor.

In accordance with another embodiment of the apparatus of the present invention, the resilient mounting means comprises a sealing member surrounding the measuring surface for joining the measuring surface to the refiner surface.

Preferably, the sealing member comprises a yieldable material. In a preferred embodiment, the apparatus includes a casing surrounding the force sensor and the measuring body, the attachment means attaching the force sensor to the casing, the measuring body including a first end and a second end, the first end of the measuring body attached to the casing and the second end of the measuring body attached to the measuring surface, the measuring surface and the sealing member closing the casing. In a preferred embodiment, the apparatus includes a sleeve enclosing the sealing means, whereby the sleeve, the sealing means and the measuring surface are inserted in the casing when the casing is sealed.

According to the method of the present invention, measurement of the force stress is performed across a measuring surface constituting a part of a refiningdisk, the measuring surface comprising at least parts of more than one bar and being resiliently mounted in relation to the surface of the refining disk. The measuring device is provided with corresponding means for performing the method. The present invention thus reveals the advantage that, in comparison with known technology, measurement of the stress force is performed over a relatively large surface, thereby producing a considerably more reliable result.

According to a preferred embodiment of the present invention, measurement is performed by the measuring surface being resiliently journalled in a direction parallel with the surface of the refining disk and being movable in said direction in the event of a stress force, in relation to a rigidly mounted force sensor with which the measuring surface is connected, the force sensor thus being influenced by and measuring the stress force. The measuring device in turn reveals features comprising equivalent members.

According to a particularly preferred feature of the present invention, the measuring device comprises a force sensor and a body connecting the sensor with the measuring surface. Through this arrangement the present invention achieves the advantage that the force stress is measured directly, instead of indirectly by measurement of linear strain and the like, as occurs with known technology.

The sensor, which is preferably a piezoelectric force sensor constructed of quartz crystal (a “quartz sensor”) also contributes to an extremely rigid measuring device being possible. The preferred sensor will withstand temperatures of up to about 200° C. and is also linear up to this temperature.

In accordance with another preferred feature of the present invention, the measuring surface is connected to the body and the part of the body that extends on the side of the force sensor opposite to the measuring surface is provided with a joint where the body is movable in a direction substantially parallel with the surface of the refining disk. However, as mentioned above, since the force sensor has a relatively stiff spring action, the shear forces will only cause extremely small movements in the joint, and thus the measuring device. This makes it easier to seal the measuring device against steam and wood chips penetrating from the surroundings, neither will it be as sensitive to material that accumulates around the measuring device. These are important advantages over the known technology. In the direction perpendicular to the measuring surface, the body has such a high degree of rigidity that no changes will occur in the refining gap, which is another advantage.

BRIEF DESCRIPTION OF THE DRAWINGS

The present invention will now be more fully described with reference to the following detailed description which, in turn, refers to the accompanying drawings, in which.

DETAILED DESCRIPTION

Figure 1:
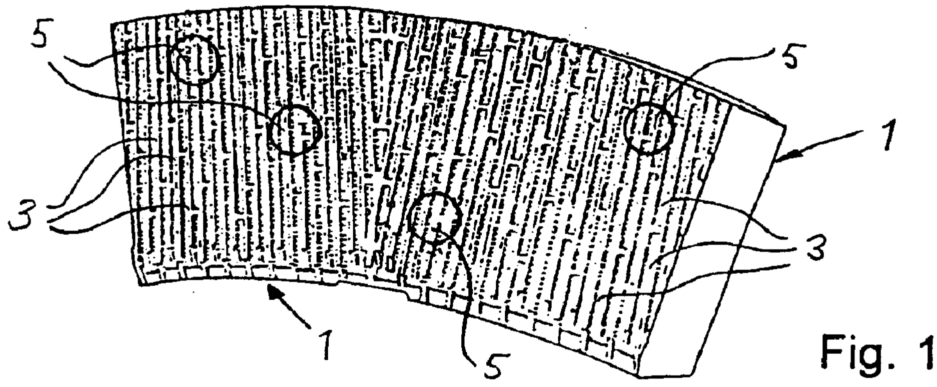
FIG. 1 is a front, perspective view of a refining segment forming part of a refining disk provided with measuring devices in accordance with the present invention.

FIG. 1 illustrates a part of a refining disk in the form of a refining segment 1, provided with a pattern comprising a number of bars 3 extending in a substantially radial direction. Measuring devices 5, in accordance with the present invention, are also illustrated schematically in FIG. 1. These measuring devices preferably have a circular measuring surface, with a diameter on the order of magnitude of 30 mm, for instance, but the measuring surface may also have a different geometric shape. The measuring devices are preferably arranged at different radial distances from the center of the refining disk, and segments at different distances from the center are also preferably provided with measuring devices. It is also advantageous for the measuring devices to be staggered peripherally in relation to each other, all with the object of being better able to determine the force distribution in the refiner and thus for better control of the refining process. When a measuring device is affected by a force parallel with the surface of the refining disk/segment, the force sensor of the measuring device will generate a signal that is proportional to the load.

Figure 2:
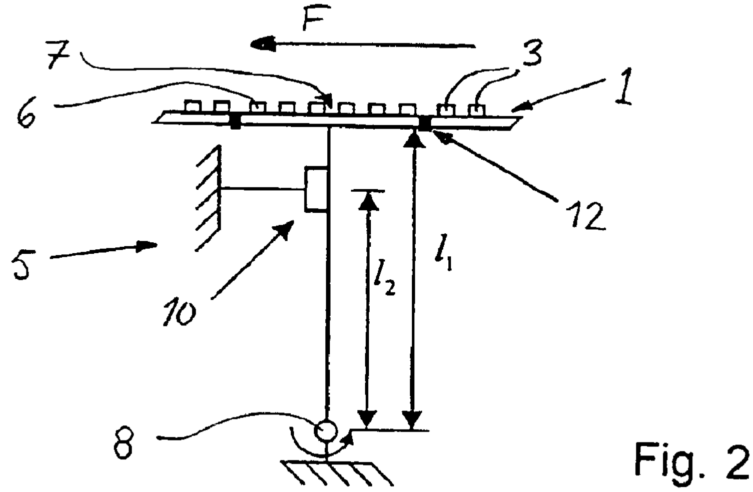
FIG. 2 is a side, elevational, schematic representation of a basic layout of a measuring device in accordance with the present invention.

The measuring device according to the present invention functions in accordance with the principle illustrated in FIG. 2. A disk segment 1 can be seen here from the side, equipped with bars 3. A measuring device 5 is also visible, comprising a part of the surface of the disk segment and being provided with a number of bars 6, or at least parts thereof. When the refining disk is subjected to a shear load F, the measuring device 5 (the sensor) will take up a load $F_m$ which is denoted by the following expression:

$$F_m = F \cdot \frac{l_1}{l_2} \tag{1}$$

where $l_2$ is the distance between the point where a sensor 10 in the measuring device is secured and the joint 8 of the device, and where $l_1$ is the distance between the measuring surface 7 of the measuring device and the joint 8. This formula is valid provided the joint does not take up any torque, and that the pressure distribution over the measuring surface 7 subjected to the shear force is not too uneven. The joint 8 consists in principle of a metal sheet of such small thickness so as to provide a negligible contribution to the total stiffness of the measuring device, while at the same time being able to withstand the loads to which it is subjected. The thickness of the metal sheet can at the same time be rather large since the sensor itself is relatively rigid, giving little flexure in the sheet. The dimension of the joint 8 is thus adjusted to withstand the vertical load occurring, while at the same time absorbing only a negligible part of the lateral load that the screw and the sensor absorb. See also the detailed description in conjunction with FIG. 4.

Figure 3A:
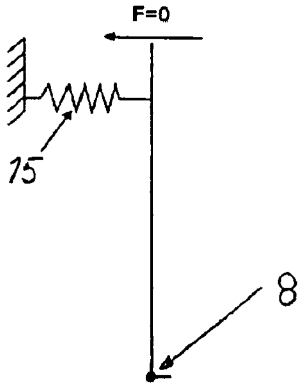
FIG. 3*a* is a schematic representation showing the force ratio applicable to the present invention.
Figure 3B:
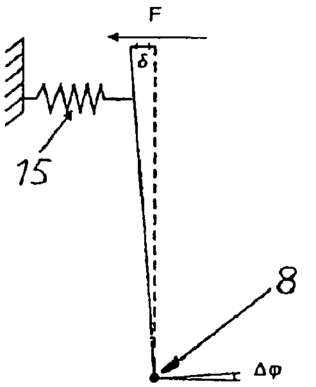
FIG. 3*b* is a schematic representation showing the force ratio applicable to the present invention.
Figure 4:
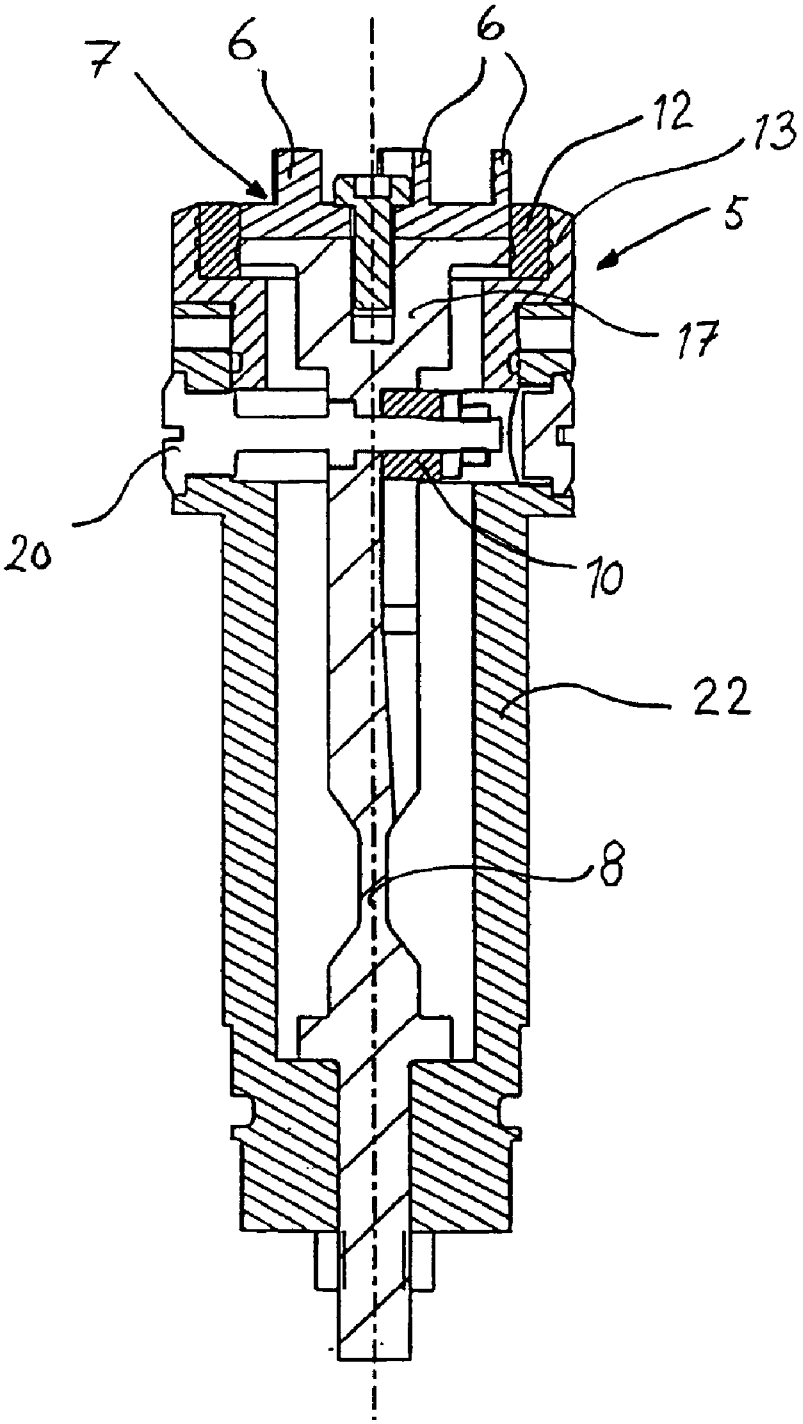
FIG. 4 is a side, elevational, partially sectional view of a measuring device in accordance with the present invention.

The model in FIGS. 3*a* and 3*b* describes how high and low rigidity, respectively, affect the function of the measuring device, through the rigidity that sensor, attachment screw (the attachment member by which the sensor is fixed in relation to the measuring surface and the body, see FIG. 4) and the joint possess. The force and the torque absorbed by the sensor/attachment screw and the joint, respectively, are controlled by the ratio $F_{sensor}=k_2\cdot\delta$ and $M=k_3\cdot\Delta\phi$, where M is the torque in the joint. $k_2$ is in this case the rigidity of the spring 15, that is to say the sensor 10 together with the attachment screw 20, and $k_3$ is the rigidity of the journaling point/joint 8. The ratio shows clearly that if F=constant and $k_2$ increases, then δ will decrease, and thus also M, since the torque is directly proportional to the flexure δ for small angles. In the case under discussion $k_2$ is large and the equation (1) is therefore valid.

It should be pointed out that, in this case, relatively high rigidity of the sensor/attachment screw results in high rigidity in relation to the load that the sensor/screw absorbs. The load may vary greatly across the refining zone, e.g. from an order of magnitude of 20 N to an order of magnitude of 150 N. In the present case, with an estimated average value of about 40 N, displacements of the measuring surface are obtained that can be measured in hundredths of a millimeter. As mentioned above, these minor displacements facilitate sealing the device from the surrounding environment. As for the body 17, this can be considered as completely rigid in the direction perpendicular to the measuring surface.

FIG. 4 shows a preferred embodiment of a measuring device in accordance with the present invention. The measuring device 5 comprises a measuring surface 7 provided with bars 6, or parts of bars, which measuring surface constitutes a part of a disk segment as illustrated in FIG. 1. As can also be seen in FIG. 1, the measuring device preferably has a circular measuring surface.

The measuring surface 7 is in direct contact with a body 17, preferably of steel, extending inside the device. The measuring surface is preferably screwed to the body 17. Slightly below the measuring surface the body 17 is provided with a transverse recess in which a force sensor 10 is arranged, preferably a quartz sensor. Here, too, the body 17 is provided with a through hole in which an attachment screw 20 is applied, passing through the hole and securing the sensor 10. The sensor 10 is thus fixed in relation to the body 17 by means of the screw 20, as will be described below. Other attachment means for the sensor 10 are possible. Otherwise, the body 17 preferably has a circular cross section. Further down beneath the sensor, the body 17 assumes a narrowing, flattened shape in an area corresponding to the joint 8, mentioned above, and described in conjunction with FIGS. 2, 3*a* and 3*b*.

The sensor 10 and the body 17 are disposed inside a protective casing 22. This casing has an opening at the top, adjacent to the surrounding refining segment, which is closed by the measuring surface 7, a seal 12 surrounding the measuring surface, and a sleeve 13 in which the seal is disposed. The seal 12 is of a particularly suitable, somewhat yielding material such as rubber, so that it can permit the small movements that the shear forces give rise to in the measuring surface, and still achieve a good seal that prevents steam and pulp from penetrating into the device. The seal preferably has a dampening effect as regards, inter alia, the vibrations that occur during operation. The purpose of the sleeve 13 is primarily to facilitate sealing of the measuring device since the measuring surface and the seal are first assembled in the sleeve which can then easily be inserted partially into the casing 22. Naturally, it is possible to omit the sleeve.

The casing 22 also has a function in securing the sensor 10 in relation to the measuring surface 7. The sensor is thus secured in the casing by means of the attachment screw 20. Finally, the body 17 is attached in the casing at the end opposite to the measuring surface.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of measuring the stress forces in a refining disk having a refining surface including a plurality of refiner bars and employed in a refiner including a pair of refiner disks defining a refining gap therebetween, said method comprising providing a measuring surface comprising at least a portion of a plurality of said refiner bars, resiliently mounting said measuring surface in said refiner surface, and measuring said stress forces across said measuring surface.

2. The method of claim 1 wherein said resilient mounting of said measuring surface comprises resiliently journaling said measuring surface in a direction substantially parallel to said refining surface whereby said measuring surface is movable in said direction in response to a stress force with respect to a permanent force sensor connected to said measuring surface.

3. The method of claim 1 including calculating the size and distribution of the output transferred to material passing through said refining gap based on said stress force measured by said measuring surface, and employing said calculation to control the refining process.

4. An apparatus for measuring stress forces in a refining disk having a refining surface including a plurality of refiner bars utilized in connection with a pair of refining disks defining a refining gap therebetween, comprising at least one measuring member disposed on said refiner surface and including a measuring surface including at least a portion of a plurality of said refiner bars, and resilient mounting means for resiliently mounting said at least one measuring member on said refiner surface, said measuring member adapted for measuring the stress forces across said measuring surface.

5. The apparatus of claim 4 wherein said at least one measuring member comprises a plurality of measuring members.

6. The apparatus of claim 4 wherein said at least one measuring member comprises a force sensor and a measuring body connecting said force sensor to said measuring surface.

7. The apparatus of claim 6 wherein said force sensor is in abutment with said measuring body, and including attachment means for fixing said force sensor with respect to said measuring body.

8. The apparatus of claim 7 wherein said resilient mounting means comprises mounting means for resiliently journaling said measuring surface in a direction substantially parallel to said refiner surface.

9. The apparatus of claim 8 wherein said measuring surface is connected to said measuring body, and said measuring body extends from said measuring surface on the side of said force sensor so as to provide a measuring body extension, said measuring body extension including a joint portion where said measuring body is movable in a direction substantially parallel to said refiner surface.

10. The apparatus of claim 9 wherein said measuring body has a substantially circular cross-section, and wherein said joint portion comprises a flattened portion of said measuring body disposed below said force sensor.

11. The apparatus of claim 6 wherein said force sensor comprises a piezoelectric sensor.

12. The apparatus of claim 4 wherein said resilient mounting means comprises a sealing member surrounding said measuring surface for joining said measuring surface to said refiner surface.

13. The apparatus of claim 12 wherein said sealing member comprises a yieldable material.

14. The apparatus of claim 13 including a casing surrounding said force sensor and said measuring body, said attachment means attaching said force sensor to said casing, said measuring body including a first end and a second end, said first end of said measuring body attached to said casing and said second end of said measuring body attached to said measuring surface, said measuring surface and said sealing member closing said casing.

15. The apparatus of claim 14 including a sleeve enclosing said sealing means, whereby said sleeve, said sealing means and said measuring surface are inserted in said casing when said casing is sealed.

16. A method of measuring the stress forces in a refining disk having a refining surface including a plurality of refiner bars and employed in a refiner including a pair of refiner disks defining a refining gap therebetween, said method comprising providing a measuring surface comprising at least a portion of a plurality of said refiner bars, resiliently mounting said measuring surface in said refiner surface, and measuring said stress forces across said measuring surface, wherein said resilient mounting of said measuring surface comprises resiliently journaling said measuring surface in a direction substantially parallel to said refining surface whereby said measuring surface is moveable in said direction in response to a stress force with respect to a permanent force sensor connected to said measuring surface.

17. The method of claim 16, further comprising calculating the size and distribution of the output transferred to material passing through said refining gap based on said stress force measured by said measuring surface, and employing said calculation to control the refining process.

18. An apparatus for measuring stress forces in a refining disk having a refining surface including a plurality of refiner bars utilized in connection with a pair of refining disks defining a refining gap therebetween, comprising at least one measuring member disposed on said refiner surface and including a measuring surface including at least a portion of a plurality of said refiner bars, and resilient mounting means for resiliently mounting said at least one measuring member on said refiner surface, wherein said measuring surface is connected to said measuring body, and said measuring body extends from said measuring surface on the side of said forced sensor so as to provide a measuring body extension, said measuring body extension including a joint portion where said measuring body is movable in a direction substantially parallel to said refiner surface.

19. The apparatus of claim 18, wherein said measuring body has a substantially circular cross-section, and wherein said joint portion comprises a flattened portion of said measuring body disposed below said force sensor.

20. The apparatus of claim 18, wherein said resilient mounting means comprises a sealing member surrounding said measuring surface for joining said measuring surface to said refiner surface, wherein said sealing member comprises a yieldable material.

21. The apparatus of claim 20 including a casing surrounding said force sensor and said measuring body, said attachment means attaching said force sensor to said casing, said measuring body including a first end and a second end, said first end of said measuring body attached to said casing and said second end of said measuring body attached to said measuring surface, said measuring surface and said sealing member closing said casing.

22. The apparatus of claim 21 including a sleeve enclosing said sealing means, whereby said sleeve, said sealing means and said measuring surface are inserted in said casing when said casing is sealed.

23. An apparatus for measuring stress forces in a refining disk having a refining surface including a plurality of refiner bars utilized in connection with a pair of refining disks defining a refining gap therebetween, comprising at least one measuring member disposed on said refiner surface and including a measuring surface including at least a portion of a plurality of said refiner bars, and resilient mounting means for resiliently mounting said at least one measuring member or said refiner surface, said resilient means having a mounting means for resiliently journaling said measuring surface in a direction substantially parallel to said refiner surface, said measuring member adapted for measuring the stress forces across said measuring surface.

* * * * *

UNITED STATES PATENT AND TRADEMARK OFFICE

CERTIFICATE OF CORRECTION

PATENT NO. : 6,915,711 B1 
DATED : July 12, 2005
INVENTOR(S) : Hans-Olof Backlund and Esko Harkonen It is certified that error appears in the above-identified patent and that said Letters Patent is hereby corrected as shown below:

Column 1,
Line 58, "have" should read -- has --.

Column 3,
Line 16, "refiningdisk," should read as two words -- refining disk, --.

Column 8,
Line 41, delete "or" and in place thereof insert -- on --.

Signed and Sealed this

Twenty-seventh Day of September, 2005

JON W. DUDAS
*Director of the United States Patent and Trademark Office*